US012322353B2

(12) United States Patent
Sim et al.

(10) Patent No.: US 12,322,353 B2
(45) Date of Patent: *Jun. 3, 2025

(54) ELECTRO-OPTIC DISPLAYS AND DRIVING METHODS

(71) Applicant: E Ink Corporation, Billerica, MA (US)

(72) Inventors: Teck Ping Sim, Acton, MA (US); Paroma Palchoudhuri, Waltham, MA (US); Kenneth R. Crounse, Somerville, MA (US); Yuval Ben-Dov, Cambridge, MA (US); Karl Raymond Amundson, Cambridge, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/678,514

(22) Filed: May 30, 2024

(65) Prior Publication Data
US 2024/0312423 A1    Sep. 19, 2024

Related U.S. Application Data

(63) Continuation of application No. 17/462,257, filed on Aug. 31, 2021, now Pat. No. 12,027,129.
(Continued)

(51) Int. Cl.
G09G 3/34        (2006.01)
G02F 1/167       (2019.01)
(Continued)

(52) U.S. Cl.
CPC ............ *G09G 3/344* (2013.01); *G02F 1/167* (2013.01); *G02F 1/1679* (2019.01); *G02F 1/1685* (2019.01)

(58) Field of Classification Search
CPC ...... G02F 1/1685; G02F 1/1679; G02F 1/167; G09G 3/344; G09G 2310/04;
(Continued)

(56) References Cited

U.S. PATENT DOCUMENTS 1,004,962 A    10/1911  Archer
4,418,346 A    11/1983  Batchelder
(Continued)

OTHER PUBLICATIONS

European Patent Office, "Extended European Search Report", EP Appl. No. 21862952.5, Aug. 13, 2024.
(Continued)

*Primary Examiner* — Ricardo Osorio
(74) *Attorney, Agent, or Firm* — Jason P. Colangelo

(57) ABSTRACT

Methods are disclosed for driving an electrophoretic display having a plurality of display pixels arranged in a matrix comprising a two-dimensional array of rows and columns of display pixels. The methods include dividing the display pixels into groups made up of a plurality of clusters, where each cluster includes a number of adjacent display pixels. The method includes updating one group of display pixels during a first frame, where display pixels not in the one group are not updated during the first frame, and each cluster in the one group of display pixels is updated at the same time. The methods include applying an edge clearing waveform to no more than eight cardinal pixels of the adjacent display pixels of each cluster.

17 Claims, 7 Drawing Sheets

Related U.S. Application Data

(60) Provisional application No. 63/072,268, filed on Aug. 31, 2020.

(51) Int. Cl.
*G02F 1/1679* (2019.01)
*G02F 1/1685* (2019.01)

(58) Field of Classification Search
CPC ....... G09G 2310/061; G09G 2310/068; G09G 2320/0242; G09G 2320/0257
See application file for complete search history.

(56) References Cited

U.S. PATENT DOCUMENTS

| | | |
|---|---|---|
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 5,930,026 A | 7/1999 | Jacobson et al. |
| 6,054,071 A | 4/2000 | Mikkelsen, Jr. |
| 6,055,091 A | 4/2000 | Sheridon et al. |
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II |
| 6,301,038 B1 | 10/2001 | Fitzmaurice et al. |
| 6,445,489 B1 | 9/2002 | Jacobson et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,672,921 B1 | 1/2004 | Liang et al. |
| 6,753,999 B2 | 6/2004 | Zehner et al. |
| 6,788,449 B2 | 9/2004 | Liang et al. |
| 6,825,970 B2 | 11/2004 | Goenaga et al. |
| 6,870,657 B1 | 3/2005 | Fitzmaurice et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,023,420 B2 | 4/2006 | Comiskey et al. |
| 7,034,783 B2 | 4/2006 | Gates et al. |
| 7,075,502 B1 | 7/2006 | Drzaic et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,193,625 B2 | 3/2007 | Danner et al. |
| 7,202,847 B2 | 4/2007 | Gates |
| 7,236,291 B2 | 6/2007 | Kaga et al. |
| 7,259,744 B2 | 8/2007 | Arango et al. |
| 7,312,784 B2 | 12/2007 | Baucom et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,492,339 B2 | 2/2009 | Amundson |
| 7,528,822 B2 | 5/2009 | Amundson et al. |
| 7,535,624 B2 | 5/2009 | Amundson et al. |
| 7,583,251 B2 | 9/2009 | Arango et al. |
| 7,602,374 B2 | 10/2009 | Zehner et al. |
| 7,612,760 B2 | 11/2009 | Kawai |
| 7,679,599 B2 | 3/2010 | Kawai |
| 7,679,814 B2 | 3/2010 | Paolini, Jr. et al. |
| 7,804,483 B2 | 9/2010 | Zhou et al. |
| 7,839,564 B2 | 11/2010 | Whitesides et al. |
| 7,952,557 B2 | 5/2011 | Amundson |
| 7,956,841 B2 | 6/2011 | Albert et al. |
| 7,999,787 B2 | 8/2011 | Amundson et al. |
| 8,009,348 B2 | 8/2011 | Zehner et al. |
| 8,077,141 B2 | 12/2011 | Duthaler et al. |
| 8,125,501 B2 | 2/2012 | Amundson et al. |
| 8,139,050 B2 | 3/2012 | Jacobson et al. |
| 8,174,490 B2 | 5/2012 | Whitesides et al. |
| 8,289,250 B2 | 10/2012 | Zehner et al. |
| 8,300,006 B2 | 10/2012 | Zhou et al. |
| 8,314,784 B2 | 11/2012 | Ohkami et al. |
| 8,319,759 B2 | 11/2012 | Jacobson et al. |
| 8,373,668 B2 | 2/2013 | Lee et al. |
| 8,384,658 B2 | 2/2013 | Albert et al. |
| 8,558,783 B2 | 10/2013 | Wilcox et al. |
| 8,928,562 B2 | 1/2015 | Gates et al. |
| 9,171,507 B2 | 10/2015 | Lin et al. |
| 9,230,492 B2 | 1/2016 | Harrington et al. |
| 9,495,918 B2 | 11/2016 | Harrington et al. |
| 9,672,766 B2 | 6/2017 | Sjodin |
| 10,163,406 B2 | 12/2018 | Sim et al. |
| 10,319,313 B2 | 6/2019 | Harris et al. |
| 10,475,396 B2 | 11/2019 | Sim et al. |
| 10,672,350 B2 | 6/2020 | Amundson et al. |
| 10,832,622 B2 | 11/2020 | Emelie et al. |
| 10,852,568 B2 | 12/2020 | Crounse et al. |
| 11,721,295 B2 | 8/2023 | Sim et al. |
| 2003/0102858 A1 | 6/2003 | Jacobson et al. |
| 2005/0253777 A1 | 11/2005 | Zehner et al. |
| 2006/0071902 A1 | 4/2006 | Zhou et al. |
| 2006/0132426 A1 | 6/2006 | Johnson |
| 2007/0103427 A1 | 5/2007 | Zhou et al. |
| 2008/0024429 A1 | 1/2008 | Zehner |
| 2008/0024482 A1 | 1/2008 | Gates et al. |
| 2008/0136774 A1 | 6/2008 | Harris et al. |
| 2010/0220121 A1 | 9/2010 | Zehner et al. |
| 2010/0265561 A1 | 10/2010 | Gates et al. |
| 2013/0194250 A1* | 8/2013 | Amundson ............ G09G 3/344 345/212 |
| 2016/0133196 A1 | 5/2016 | Emelie et al. |
| 2016/0225322 A1* | 8/2016 | Sim ........................ G09G 3/344 |

OTHER PUBLICATIONS

Wood, D., "An Electrochromic Renaissance?" Information Display, 18(3), 24 (Mar. 2002) Mar. 1, 2002.

O'Regan, B et al., "A Low Cost, High-efficiency Solar Cell Based on Dye-sensitized colloidal TiO2 Films", Nature, vol. 353, pp. 737-740 (Oct. 24, 1991). Oct. 24, 1991.

Bach, Udo et al., "Nanomaterials-Based Electrochromics for Paper-Quality Displays", Adv. Mater, vol. 14, No. 11, pp. 845-848, (Jun. 5, 2002). Jun. 5, 2002.

Hayes, R.A. et al., "Video-Speed Electronic Paper Based on Electrowetting", Nature, vol. 425, No. 25, pp. 383-385 (Sep. 2003). Sep. 25, 2003.

Kitamura, T. et al., "Electrical toner movement for electronic paper-like display", Asia Display/IDW '01, pp. 1517-1520, Paper HCS1-1 (2001). 2001.

Yamaguchi, Y. et al., "Toner display using insulative particles charged triboelectrically", Asia Display/IDW '01, pp. 1729-1730, Paper AMD4-4 (2001). 2001.

Korean Intellectual Property Office, "International Search Report and Written Opinion", PCT/US2021/048350, Dec. 16, 2021. Dec. 16, 2021.

* cited by examiner

ELECTRO-OPTIC DISPLAYS AND DRIVING METHODS

REFERENCE TO RELATED APPLICATIONS

This application is a continuation of co-pending U.S. application Ser. No. 17/462,257, filed Aug. 31, 2021 (Publication No. 2022-0068229), which claims priority to U.S. Provisional Patent Application No. 63/072,268, filed on Aug. 31, 2020.

The entire disclosures of the aforementioned applications, and of any patent, published application, or other published work referenced below, are incorporated herein by reference.

BACKGROUND OF THE INVENTION

Aspects of the present disclosure relate to electro-optic displays such as bistable electro-optic displays, and to methods for resetting display pixels of these bistable electro-optic displays. More specifically, this invention relates to driving methods that when display pixel are reset, the display appears less flash, experiences less stress and consumes less power compares to other driving methods.

SUMMARY OF THE INVENTION

According to one aspect of the subject matter disclosed herein, a method for driving an electrophoretic display having a plurality of display pixels, the method comprising dividing the plurality of display pixels into a plurality of groups, updating one group of display pixels from the plurality of groups of display pixels, the one group of display pixels includes at least n number of adjacent display pixels being updated at the same time, wherein n is an integer greater than or equal to 2, and applying an edge clearing waveform to no more than (n×2)+2 number of cardinal pixels of the one group of display pixels.

In another aspect, a method for driving an electrophoretic display having a plurality of display pixels can include dividing the plurality of display pixels into a plurality of groups, applying a first waveform to one group of display pixels from the plurality of groups of display pixels, the one group of display pixels includes at least two adjacent display pixels being updated at the same time; and applying a second waveform to no more than six cardinal pixels of the one group of display pixels.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 2A to FIG. 2C illustrates another driving method for updating a display with a plurality of display pixels;

DETAILED DESCRIPTION

Figures 1A, 1B:
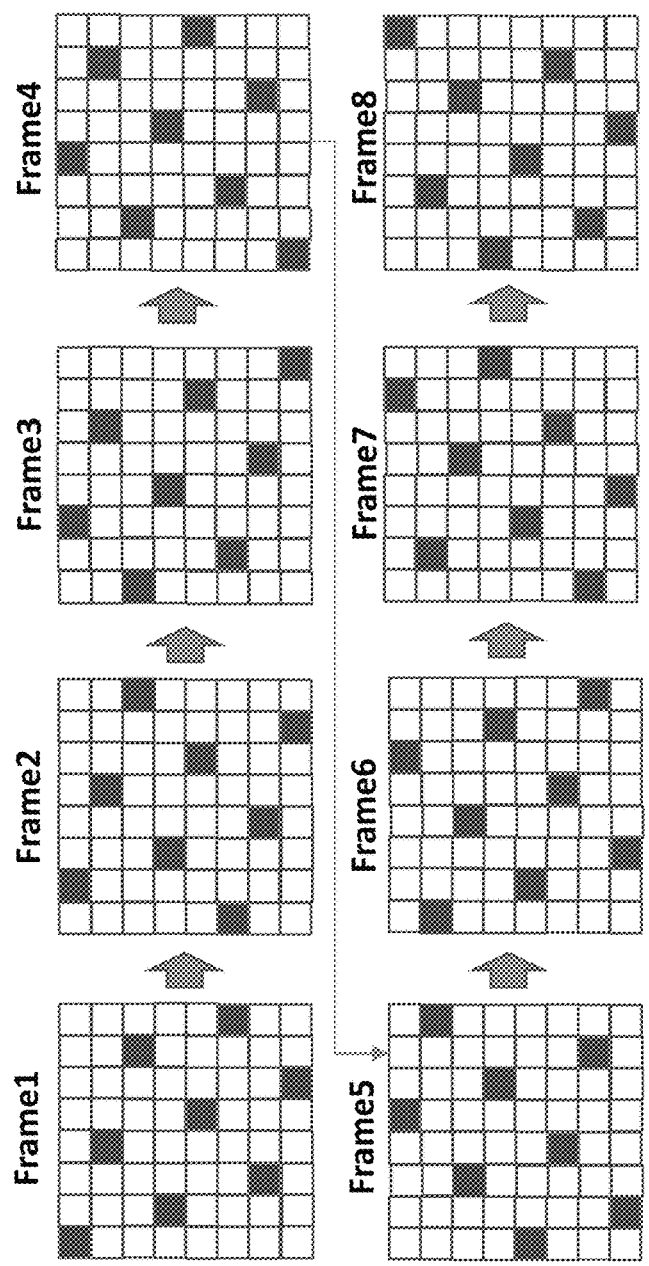
FIG. 1A shows an electro-optic display with a plurality of display pixels designated with numbers for an update or reset.
FIG. 1B shows display pixels of the electro-optic display of FIG. 1A going through multiple updating or resetting frames.

The present invention relates to methods for driving electro-optic displays in dark mode, especially bistable electro-optic displays, and to apparatus for use in such methods. More specifically, this invention relates to driving methods which may allow for reduced "ghosting" and edge artifacts, and reduced flashing in such displays when displaying white text on a black background. This invention is especially, but not exclusively, intended for use with particle-based electrophoretic displays in which one or more types of electrically charged particles are present in a fluid and are moved through the fluid under the influence of an electric field to change the appearance of the display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to above describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

Much of the discussion below will focus on methods for driving one or more pixels of an electro-optic display through a transition from an initial gray level (or "graytone") to a final gray level (which may or may not be different from the initial gray level). The terms "gray state," "gray level" and "graytone" are used interchangeably herein and include the extreme optical states as well as the intermediate gray states. The number of possible gray levels in current systems is typically 2-16 due to limitations such as discreteness of driving pulses imposed by the frame rate of the display drivers and temperature sensitivity. For example, in a black and white display having 16 gray levels, usually, gray level 1 is black and gray level 16 is white; however, the black and white gray level designations may be reversed. Herein, graytone I will be used to designate black. Graytone 2 will be a lighter shade of black as the graytones progress towards graytone 16 (i.e., white).

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

The term "remnant voltage" is used herein to refer to a persistent or decaying electric field that may remain in an electro-optic display after an addressing pulse (a voltage pulse used to change the optical state of the electro-optic medium) is terminated. Such remnant voltages can lead to undesirable effects on the images displayed on electro-optic displays, including, without limitation, so-called "ghosting" phenomena, in which, after the display has been rewritten, traces of the previous image are still visible. The application 2003/0137521 describes how a direct current (DC) imbalanced waveform can result in a remnant voltage being created, this remnant voltage being ascertainable by measuring the open-circuit electrochemical potential of a display pixel.

The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane.

Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728; and 7,679,814;

(b) Capsules, binders and encapsulation processes; see for example U.S. Pat. Nos. 6,922,276; and 7,411,719;

(c) Films and sub-assemblies containing electro-optic materials; see for example U.S. Pat. Nos. 6,982,178; and 7,839,564;

(d) Backplanes, adhesive layers and other auxiliary layers and methods used in displays; see for example U.S. Pat. Nos. 7,116,318; and 7,535,624;

(e) Color formation and color adjustment; see for example U.S. Pat. No. 7,075,502; and U.S. Patent Application Publication No. 2007/0109219;

(f) Methods for driving displays; see the aforementioned MEDEOD applications;

(g) Applications of displays; see for example U.S. Pat. No. 7,312,784; and U.S. Patent Application Publication No. 2006/0279527; and (h) Non-electrophoretic displays, as described in U.S. Pat. Nos. 6,241,921; 6,950,220; and 7,420,549; and U.S. Patent Application Publication No. 2009/0046082.

(i) "MEDEOD" (MEthods for Driving Electro-Optic Displays) applications. The entire contents of these patents and co-pending applications, and of all other U.S. patents and published and co-pending applications mentioned below, are herein incorporated by reference: U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,116,466; 7,119,772; 7,193,625; 7,202,847; 7,259,744; 7,304,787; 7,312,794; 7,327,511; 7,453,445; 7,492,339; 7,528,822; 7,545,358; 7,583,251; 7,602,374; 7,612,760; 7,679,599; 7,688,297; 7,729,039; 7,733,311; 7,733,335; 7,787,169; 7,952,557; 7,956,841; 7,999,787; 8,077,141; and 8,558,783; U.S. Patent Applications Publication Nos. 2003/0102858; 2005/0122284; 2005/0253777; 2006/0139308; 2007/0013683; 2007/0091418; 2007/0103427; 2007/0200874; 2008/0024429; 2008/0024482; 2008/0048969; 2008/0129667; 2008/0136774; 2008/0150888; 2008/0291129; 2009/0174651; 2009/0179923; 2009/0195568; 2009/0256799; 2009/0322721; 2010/0045592; 2010/0220121; 2010/0220122; 2010/0265561; 2011/0285754; 2013/0194250, 2014/0292830 and 2016/0225322; PCT Published Application No. WO 2015/017624; and U.S. patent application Ser. No. 15/014,236 filed Feb. 3, 2016.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

The bistable or multi-stable behavior of particle-based electrophoretic displays, and other electro-optic displays displaying similar behavior (such displays may hereinafter for convenience be referred to as "impulse driven displays"), is in marked contrast to that of conventional liquid crystal ("LC") displays. Twisted nematic liquid crystals are not bior multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

Whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner.

It might at first appear that the ideal method for addressing such an impulse-driven electro-optic display would be so-called "general grayscale image flow" in which a controller arranges each writing of an image so that each pixel transitions directly from its initial gray level to its final gray level. However, inevitably there is some error in writing images on an impulse-driven display. Some such errors encountered in practice include:

(a) Prior State Dependence; With at least some electro-optic media, the impulse required to switch a pixel to a new optical state depends not only on the current and desired optical state, but also on the previous optical states of the pixel.

(b) Dwell Time Dependence; With at least some electro-optic media, the impulse required to switch a pixel to a new optical state depends on the time that the pixel has spent in its various optical states. The precise nature of this dependence is not well understood, but in general, more impulse is required the longer the pixel has been in its current optical state.

(c) Temperature Dependence; The impulse required to switch a pixel to a new optical state depends heavily on temperature.

(d) Humidity Dependence; The impulse required to switch a pixel to a new optical state depends, with at least some types of electro-optic media, on the ambient humidity.

(e) Mechanical Uniformity; The impulse required to switch a pixel to a new optical state may be affected by mechanical variations in the display, for example variations in the thickness of an electro-optic medium or an associated lamination adhesive. Other types of mechanical non-uniformity may arise from inevitable variations between different manufacturing batches of medium, manufacturing tolerances and materials variations.

(f) Voltage Errors; The actual impulse applied to a pixel will inevitably differ slightly from that theoretically applied because of unavoidable slight errors in the voltages delivered by drivers.

General grayscale image flow suffers from an "accumulation of errors" phenomenon. For example, imagine that temperature dependence results in a 0.2 L* (where L* has the usual CIE definition:

$$L^* = 116(R/R0)1/3 - 16,$$

where R is the reflectance and R0 is a standard reflectance value) error in the positive direction on each transition. After fifty transitions, this error will accumulate to 10 L*. Perhaps more realistically, suppose that the average error on each transition, expressed in terms of the difference between the theoretical and the actual reflectance of the display is ±0.2 L*. After 100 successive transitions, the pixels will display an average deviation from their expected state of 2 L*; such deviations are apparent to the average observer on certain types of images.

This accumulation of errors phenomenon applies not only to errors due to temperature, but also to errors of all the types listed above. As described in the aforementioned U.S. Pat. No. 7,012,600, compensating for such errors is possible, but only to a limited degree of precision. For example, temperature errors can be compensated by using a temperature sensor and a lookup table, but the temperature sensor has a limited resolution and may read a temperature slightly different from that of the electro-optic medium. Similarly, prior state dependence can be compensated by storing the prior states and using a multi-dimensional transition matrix, but controller memory limits the number of states that can be recorded and the size of the transition matrix that can be stored, placing a limit on the precision of this type of compensation.

Thus, general grayscale image flow requires very precise control of applied impulse to give good results, and empirically it has been found that, in the present state of the technology of electro-optic displays, general grayscale image flow is infeasible in a commercial display.

The US Patent Publication No. 2013/0194250, now U.S. Pat. No. 10,672,350, which is incorporated in its entirety herein, describes techniques for reducing flashing and edge ghosting. One such technique, denoted a "selective general update" or "SGU" method, involves driving an electro-optic display having a plurality of pixels using a first drive scheme, in which all pixels are driven at each transition, and a second drive scheme, in which pixels undergoing some transitions are not driven. The first drive scheme is applied to a non-zero minor proportion of the pixels during a first update of the display, while the second drive scheme is applied to the remaining pixels during the first update. During a second update following the first update, the first drive scheme is applied to a different non-zero minor proportion of the pixels, while the second drive scheme is applied to the remaining pixels during the second update. Typically, the SGU method is applied to refreshing the white background surrounding text or an image, so that only a minor proportion of the pixels in the white background undergo updating during any one display update, but all pixels of the background are gradually updated so that drifting of the white background to a gray color is avoided without any need for a flashy update. It will readily be apparent to those skilled in the technology of electro-optic displays that application of the SGU method requires a special waveform (hereinafter referred to as an "F" waveform or "F-Transition") for the individual pixels which are to undergo updating on each transition.

The aforementioned US Patent Publication No. 2013/0194250 also describes a "balanced pulse pair white/white transition drive scheme" or "BPPWWTDS", which involves the application of one or more balanced pulse pairs (a balanced pulse pair or "BPP" being a pair of drive pulses of opposing polarities such that the net impulse of the balanced pulse pair is substantially zero) during white-to-white transitions in pixels which can be identified as likely to give rise to edge artifacts, and are in a spatio-temporal configuration such that the balanced pulse pair(s) will be efficacious in erasing or reducing the edge artifact. Desirably, the pixels to which the BPP is applied are selected such that the BPP is masked by other update activity. Note that application of one or more BPP's does not affect the desirable DC balance of a drive scheme since each BPP inherently has zero net impulse and thus does not alter the DC balance of a drive scheme. A second such technique, denoted "white/white top-off pulse drive scheme" or "WWTOPDS", involves applying a "top-off" pulse during white-to-white transitions in pixels which can be identified as likely to give rise to edge artifacts, and are in a spatio-temporal configuration such that the top-off pulse will be efficacious in erasing or reducing the edge artifact. Application of the BPPWWTDS or WWTOPDS again requires a special waveform (hereinafter referred to as a "T" waveform or "T-Transition") for the individual pixels which are to undergo updating on each transition. The T and F waveforms are normally only applied to pixels undergoing white-to-white transitions. In a global limited drive scheme, the white-to-white waveform is empty (i.e., consists of a series of zero voltage pulses) whereas all other waveforms are not empty. Accordingly, when applicable the non-empty T and F waveforms replace the empty white-to-white waveforms in a global limited drive scheme.

Under some circumstances, it may be desirable for a single display to make use of multiple drive schemes. For example, a display capable of more than two gray levels may make use of a gray scale drive scheme ("GSDS") which can effect transitions between all possible gray levels, and a monochrome drive scheme ("MDS") which effects transitions only between two gray levels, the MDS providing quicker rewriting of the display than the GSDS. The MDS is used when all the pixels which are being changed during a rewriting of the display are effecting transitions only between the two gray levels used by the MDS. For example, the aforementioned U.S. Pat. No. 7,119,772 describes a display in the form of an electronic book or similar device capable of displaying gray scale images and also capable of displaying a monochrome dialogue box which permits a user to enter text relating to the displayed images. When the user is entering text, a rapid MDS is used for quick updating of the dialogue box, thus providing the user with rapid confirmation of the text being entered. On the other hand, when the entire gray scale image shown on the display is being changed, a slower GSDS is used.

Alternatively, a display may make use of a GSDS simultaneously with a "direct update" drive scheme ("DUDS"). The DUDS may have two or more than two gray levels, typically fewer than the GSDS, but the most important characteristic of a DUDS is that transitions are handled by a simple unidirectional drive from the initial gray level to the final gray level, as opposed to the "indirect" transitions often used in a GSDS, where in at least some transitions the pixel is driven from an initial gray level to one extreme optical state, then in the reverse direction to a final gray level; in some cases, the transition may be effected by driving from the initial gray level to one extreme optical state, thence to the opposed extreme optical state, and only then to the final extreme optical state-see, for example, the drive scheme illustrated in FIGS. 11A and 11B of the aforementioned U.S. Pat. No. 7,012,600. Thus, present electrophoretic displays may have an update time in grayscale mode of about two to three times the length of a saturation pulse (where "the length of a saturation pulse" is defined as the time period, at a specific voltage, that suffices to drive a pixel of a display from one extreme optical state to the other), or approximately 700-900 milliseconds, whereas a DUDS has a maximum update time equal to the length of the saturation pulse, or about 200-300 milliseconds.

Variation in drive schemes is, however, not confined to differences in the number of gray levels used. For example, drive schemes may be divided into global drive schemes, where a drive voltage is applied to every pixel in the region to which the global update drive scheme (more accurately referred to as a "global complete" or "GC" drive scheme) is being applied (which may be the whole display or some defined portion thereof) and partial update drive schemes, where a drive voltage is applied only to pixels that are undergoing a non-zero transition (i.e., a transition in which the initial and final gray levels differ from each other), but no drive voltage or zero voltage is applied during zero transitions or null transitions (in which the initial and final gray levels are the same). As used herein, the terms "zero transition" and "null transition" are used interchangeably. An intermediate form of drive scheme (designated a "global limited" or "GL" drive scheme) is similar to a GC drive scheme except that no drive voltage is applied to a pixel which is undergoing a zero, white-to-white transition. In, for example, a display used as an electronic book reader, displaying black text on a white background, there are numerous white pixels, especially in the margins and between lines of text which remain unchanged from one page of text to the next; hence, not rewriting these white pixels substantially reduces the apparent "flashiness" of the display rewriting.

However, certain problems remain in this type of GL drive scheme. Firstly, as discussed in detail in some of the aforementioned MEDEOD applications, bistable electro-optic media are typically not completely bistable, and pixels placed in one extreme optical state gradually drift, over a period of minutes to hours, towards an intermediate gray level. In particular, pixels driven white slowly drift towards a light gray color. Hence, if in a GL drive scheme a white pixel is allowed to remain undriven through a number of page turns, during which other white pixels (for example, those forming parts of the text characters) are driven, the freshly updated white pixels will be slightly lighter than the undriven white pixels, and eventually the difference will become apparent even to an untrained user.

Secondly, when an undriven pixel lies adjacent a pixel which is being updated, a phenomenon known as "blooming" occurs, in which the driving of the driven pixel causes a change in optical state over an area slightly larger than that of the driven pixel, and this area intrudes into the area of adjacent pixels. Such blooming manifests itself as edge effects along the edges where the undriven pixels lie adjacent driven pixels. Similar edge effects occur when using regional updates (where only a particular region of the display is updated, for example to show an image), except that with regional updates the edge effects occur at the boundary of the region being updated. Over time, such edge effects become visually distracting and must be cleared. Hitherto, such edge effects (and the effects of color drift in undriven white pixels) have typically been removed by using a single GC update at intervals. Unfortunately, use of such an occasional GC update reintroduces the problem of a "flashy" update, and indeed the flashiness of the update may be heightened by the fact that the flashy update only occurs at long intervals.

Some of the aspects of the present invention relates to reducing or eliminating the problems discussed above while still avoiding so far as possible flashy updates. However, there is an additional complication in attempting to solve the aforementioned problems, namely the need for overall DC balance. As discussed in many of the aforementioned MEDEOD applications, the electro-optic properties and the working lifetime of displays may be adversely affected if the drive schemes used are not substantially DC balanced (i.e., if the algebraic sum of the impulses applied to a pixel during any series of transitions beginning and ending at the same gray level is not close to zero). See especially the aforementioned U.S. Pat. No. 7,453,445, which discusses the problems of DC balancing in so-called "heterogeneous loops" involving transitions carried out using more than one drive scheme. A DC balanced drive scheme ensures that the total net impulse bias at any given time is bounded (for a finite number of gray states). In a DC balanced drive scheme, each optical state of the display is assigned an impulse potential (IP) and the individual transitions between optical states are defined such that the net impulse of the transition is equal to the difference in impulse potential between the initial and final states of the transition. In a DC balanced drive scheme, any round trip net impulse is required to be substantially zero.

In one aspect, this invention provides methods of driving an electro-optic display having a plurality of pixels to display white text on a black background ("dark mode" also referred to herein as "black mode") while reducing edge artifacts, ghosting and flashy updates. In addition, the white text may include pixels having intermediate gray levels, if the text is anti-aliased. Displaying black text on a light or white background is referred to herein as "light mode" or "white mode". Typically, when displaying white text on a black background, white edges or edge artifacts may accumulate after multiple updates (as with dark edges in the light mode). This edge accumulation is particularly visible when the background pixels (i.e., pixels in the margins and in the leading between lines of text) do not flash during updates (i.e., the background pixels, which remain in the black extreme optical state through repeated updates, undergo repeated black-to-black zero transitions, during which no drive voltages are applied to the pixels, and they do not flash). A dark mode where no drive voltages are applied during black-to-black transitions may be referred to as a "dark GL mode"; this is essentially the inverse of a light GL mode where no drive voltages are applied to the background pixels undergoing white-to-white zero transitions. The dark GL mode may be implemented by simply defining a zero transition for black-to-black pixels, but also, may be implemented by some other means such as a partial update by the controller.

Figure 5:
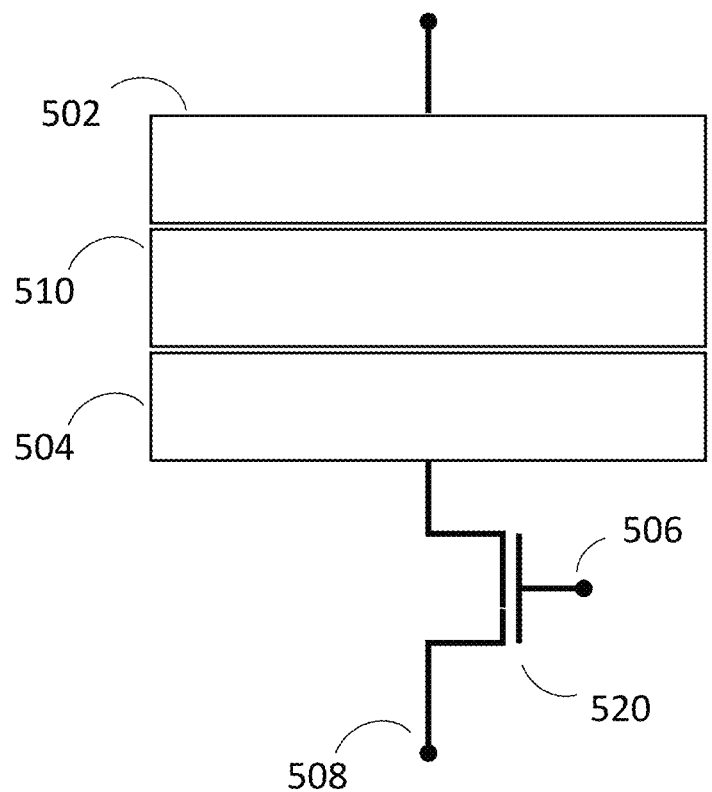
FIG. 5 is a circuit diagram representing an electrophoretic display.

FIG. 5 shows a schematic of a pixel 500 of an electrophoretic display in accordance with the subject matter submitted herein. Pixel 500 may include an imaging film 510. In some embodiments, imaging film 510 may be bistable. In some embodiments, imaging film 510 may include, without limitation, an encapsulated electrophoretic imaging film, which may include, for example, charged pigment particles.

Imaging film 510 may be disposed between a front electrode 502 and a rear electrode 504. Front electrode 502 may be formed between the imaging film and the front of the display. In some embodiments, front electrode 502 may be transparent. In some embodiments, front electrode 502 may be formed of any suitable transparent material, including, without limitation, indium tin oxide (ITO). Rear electrode 104 may be formed opposite a front electrode 502. In some embodiments, a parasitic capacitance (not shown) may be formed between front electrode 502 and rear electrode 504.

Pixel 500 may be one of a plurality of pixels. The plurality of pixels may be arranged in a two-dimensional array of rows and columns to form a matrix, such that any specific pixel is uniquely defined by the intersection of one specified row and one specified column. In some embodiments, the matrix of pixels may be an "active matrix," in which each pixel is associated with at least one non-linear circuit element 520. The non-linear circuit element 520 may be coupled between back-plate electrode 504 and an addressing electrode 508. In some embodiments, non-linear element 520 may include a diode and/or a transistor, including, without limitation, a MOSFET. The drain (or source) of the MOSFET may be coupled to back-plate electrode 504, the source (or drain) of the MOSFET may be coupled to addressing electrode 508, and the gate of the MOSFET may be coupled to a driver electrode 506 configured to control the activation and deactivation of the MOSFET. (For simplicity, the terminal of the MOSFET coupled to back-plate electrode 504 will be referred to as the MOSFET's drain, and the terminal of the MOSFET coupled to addressing electrode 508 will be referred to as the MOSFET's source. However, one of ordinary skill in the art will recognize that, in some embodiments, the source and drain of the MOSFET may be interchanged.)

In some embodiments of the active matrix, the addressing electrodes 508 of all the pixels in each column may be connected to a same column electrode, and the driver electrodes 506 of all the pixels in each row may be connected to a same row electrode. The row electrodes may be connected to a row driver, which may select one or more rows of pixels by applying to the selected row electrodes a voltage sufficient to activate the non-linear elements 520 of all the pixels 500 in the selected row(s). The column electrodes may be connected to column drivers, which may place upon the addressing electrode 506 of a selected (activated) pixel a voltage suitable for driving the pixel into a desired optical state. The voltage applied to an addressing electrode 508 may be relative to the voltage applied to the pixel's front-plate electrode 502 (e.g., a voltage of approximately zero volts). In some embodiments, the front-plate electrodes 502 of all the pixels in the active matrix may be coupled to a common electrode.

In some embodiments, the pixels 500 of the active matrix may be written in a row-by-row manner. For example, a row of pixels may be selected by the row driver, and the voltages corresponding to the desired optical states for the row of pixels may be applied to the pixels by the column drivers. After a pre-selected interval known as the "line address time," the selected row may be deselected, another row may be selected, and the voltages on the column drivers may be changed so that another line of the display is written.

Figure 6:
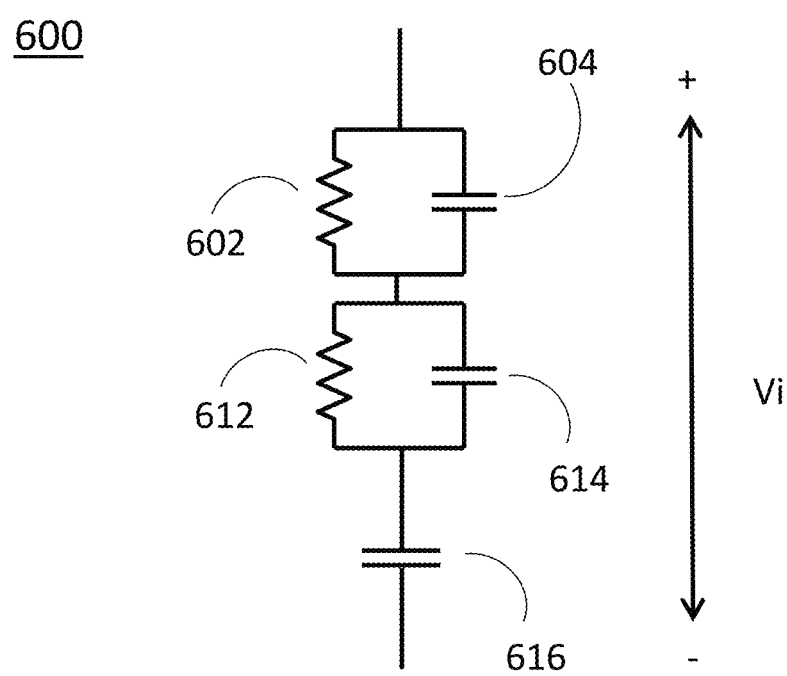
FIG. 6 shows a circuit model of the electro-optic imaging layer.

FIG. 6 shows a circuit model of the electro-optic imaging layer 510 disposed between the front electrode 502 and the rear electrode 504 in accordance with the subject matter presented herein. Resistor 602 and capacitor 604 may represent the resistance and capacitance of the electro-optic imaging layer 510, the front electrode 502 and the rear electrode 504, including any adhesive layers. Resistor 612 and capacitor 614 may represent the resistance and capacitance of a lamination adhesive layer. Capacitor 616 may represent a capacitance that may form between the front electrode 502 and the back electrode 504, for example, interfacial contact areas between layers, such as the interface between the imaging layer and the lamination adhesive layer and/or between the lamination adhesive layer and the backplane electrode. A voltage Vi across a pixel's imaging film 510 may include the pixel's remnant voltage.

FIG. 1A illustrates one method of pixel clearing in accordance with the subject matter presented herein. In this method, the pixels of a display may be divided into different portions, where each display pixel is assigned a numerical marker (e.g., 1, 2, 3, 4, 5, 6, 7, 8 etc.), and the assignment of the marker may be done periodically or randomly. When resetting the display, display pixels with the same numerical marker will get reset together. For example, as illustrated in FIG. 1B, frame 1 of a driving method may update or reset all the display pixels designated or marked with the numerical number 1. Subsequently on the next frame, in Frame 2 or the second frame, all the display pixels designated with the numerical number 2 may be updated or reset. Similarly, as illustrated in FIG. 1B, Frame 3 or the third frame will update or reset all the display pixels designated number 3; the next frame (i.e., Frame 4 or the fourth frame) will update or reset all the display pixels designated with the number 4; and the following frame (i.e., Frame 5 or the fifth frame) will update or reset all the display pixels designated with the number 5; and the next frame (i.e., Frame 6 or the sixth frame) will update or reset all the display pixels designated with the number 6; and the next frame (i.e., Frame 7 or the seventh frame) will update or reset all the display pixels designated with the number 7; and likewise, the following frame (i.e., Frame 8 or the eighth frame) will update or reset all the display pixels designated with the number 8. In this configuration, this driving method updates or resets the display one portion at a time (i.e., one eighth of the entire pixels at a time), thereby reducing the flashness resulting from the updating or resetting.

Figure 2A:
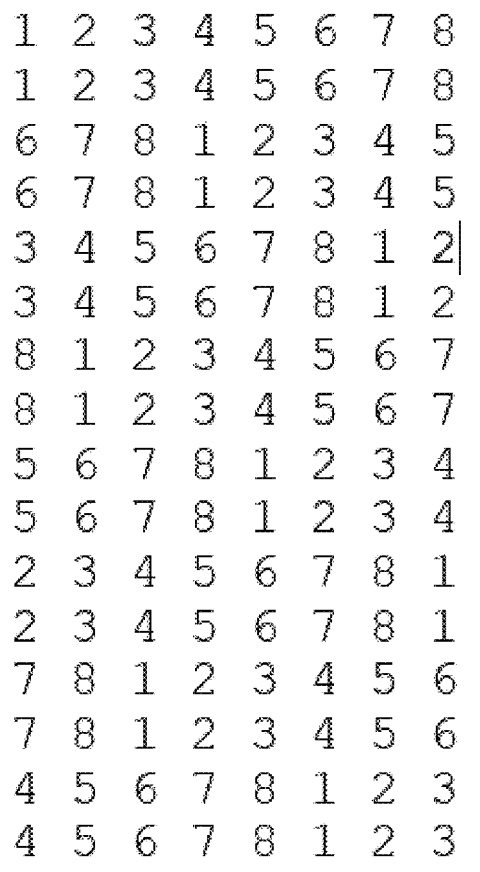
Figure 2C:
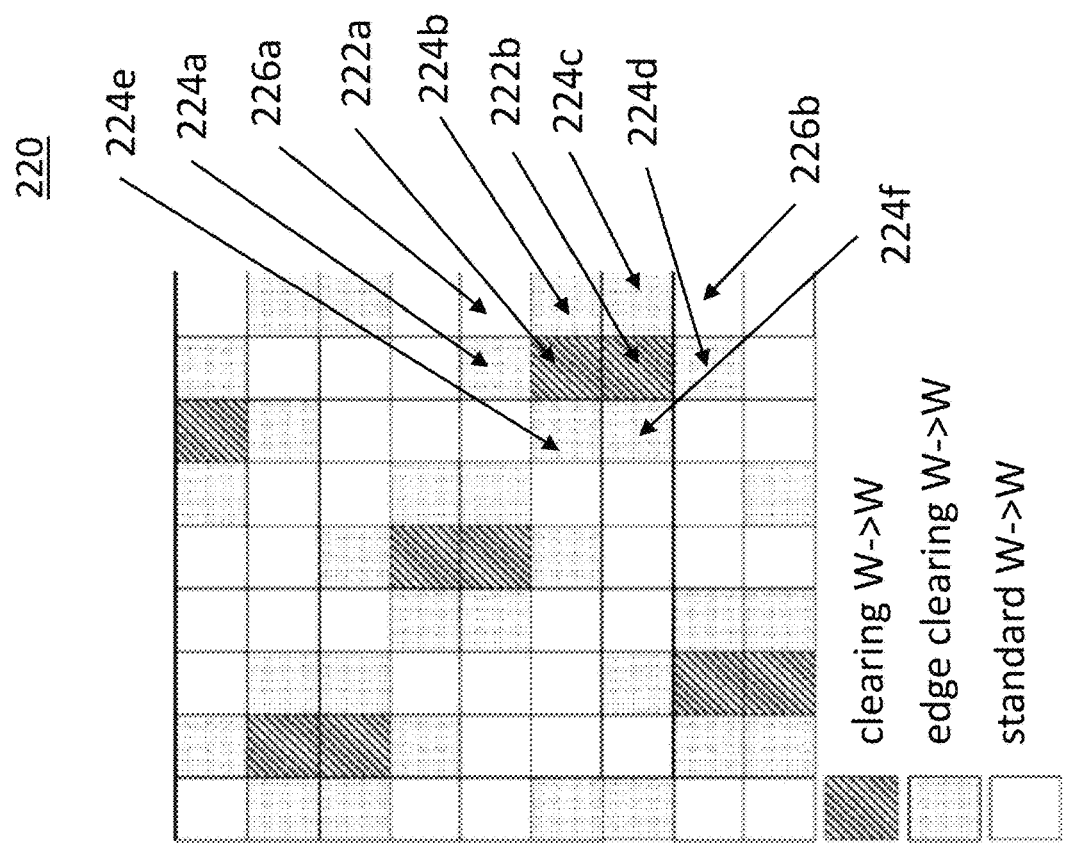
Figure 2B:
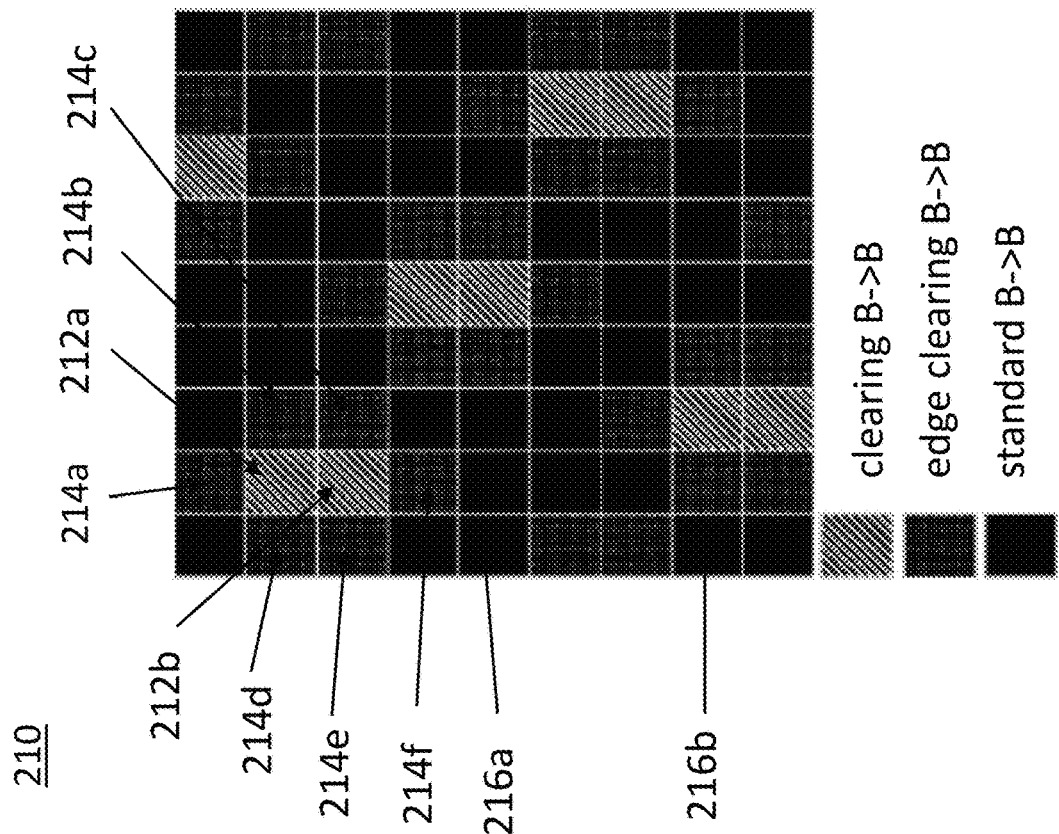

Alternatively, pixels may be clustered for the updating or resetting, as illustrated in FIG. 2A to FIG. 2C. Compared to FIG. 1A where no two cardinal or neighboring pixels are updated or reset during the same frame, the driving method illustrated in FIGS. 2A to 2C have two or more cardinal or neighboring display pixels being updated or reset together. Referring now to FIG. 2A, when designating display pixels with numbers, neighboring or cardinal pixels may be designated with the same number, meaning, they may be updated or reset together or during the same frame. For example, referring to the first two rows of display pixels shown in FIG. 2A, pixels in the first and second rows may have the same number. As such, during updating or resetting, these two pixels may be updated or reset at the same time or during the same frame (e.g., the two pixels designated with number 1 from the first two rows may be reset together during Frame 1; similarly, the two pixels designated with number 6 from the first two rows may be reset together during Frame 6). In a gist, at least two adjacent display pixels designated of the same numerical group may be driven together with a first waveform, where this first waveform may be an update waveform or a reset waveform. And where the term adjacent here refers to display pixels having common vertex or a common side. Referring now to FIG. 2B, a display 210 with a dark background may be updated or reset using the method outlined in FIG. 2A. For example, pixels 212a and 212b are designated for updating or resetting may be reset using a black-to-black clearing waveform. However, this black-to-back clearing waveform can cause edge artifacts to develop in the neighboring or cardinal pixels 214a, 214b, 214c, 214d, 214e and 214f. In this case, to clear these edge artifacts, these cardinal pixels 214a, 214b, 214c, 214d, 214e and 214f will be applied with a black-to-black edge clearing waveform, while the rest of the pixels such as pixels 216a and 216b are applied with a standard black-to-black waveform. In some embodiments, this black-to-black edge clearing waveform may be dc-imbalanced, in which case remnant charges may accumulate within the display medium due to this dc-imbalance. Similarly, as illustrated in FIG. 2C, a display 220 with white background may be updated or reset using method outlined in FIG. 2A. Pixels 222a and 222b are designated for updating or resetting may be reset using a white-to-white clearing waveform. Similarly, this white-to-white clearing waveform may also cause edge artifacts to develop in the cardinal pixels 224a, 224b, 224c, 224d, 224c and 224f, and a white-to-white edge clearing waveform may be applied to clear these edge artifacts, while a standard white-to-white waveform may be applied to the rest of the pixels 226a and 226b. And like the display 210 with dark background illustrated in FIG. 2B, these white-to-white edge clearing waveforms may be dc-imbalanced and can cause remnant charge built up in the display medium, which can cause stress to the display and negatively affect display performance.

Figure 4:
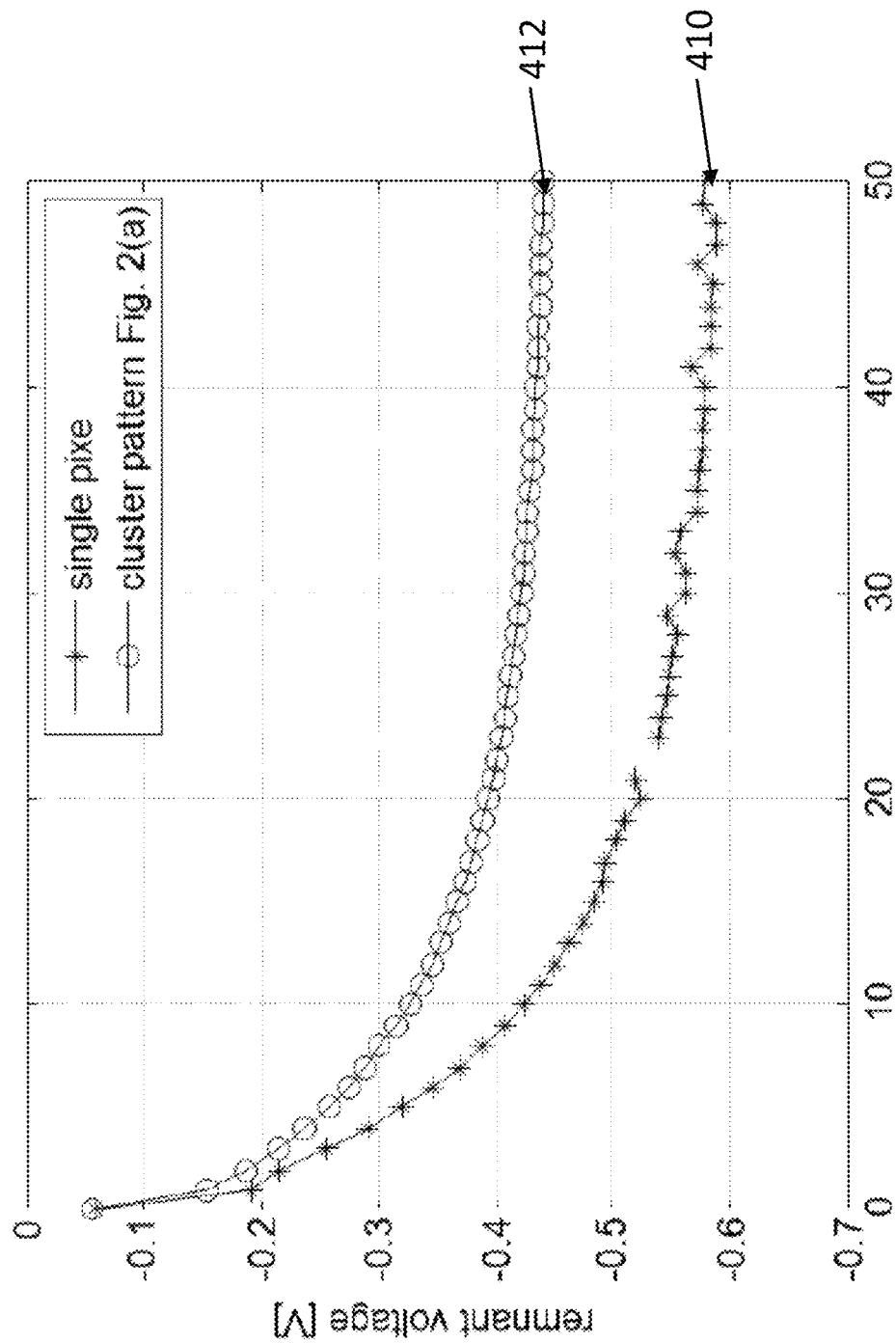
FIG. 4 illustrates a comparison of remnant voltage built up between different driving methods.

In comparison, the driving method illustrated in FIGS. 2A to 2C generates less remnant charges to the display compared to the driving method illustrated in FIGS. 1A and 1B. This is at least in part due to the fact that by clustering the resetting pixels, fewer cardinal pixels (e.g., pixels 214a, 214b, 214c, 214d, 214c and 214f; pixels 224a, 224b, 224c, 224*d*, 224*c* and 224*f*) will require edge clearing compared to the method outlined in FIGS. 1A and 1B. Specifically, in FIGS. 1A and 1B, every reset pixel will require at least 4 cardinal pixels to be driven with dc-imbalanced edge clearing waveforms. In comparison, only 3 such cardinal pixels are to be driven with DC-imbalanced edge clearing waveforms in the method illustrated in FIGS. 2A to 2C. FIG. 4 illustrates a comparison in remnant charge built up between the two methods outlined above. The curve 412 is the remnant charge built up using the method illustrated in FIGS. 2A to 2C and curve 410 is the remnant charge built up using the method illustrated in FIGS. 1A and 1B. It is clearly shown that by clustering the reset pixels remnant charge built ups may be effectively reduced in a display. Also, as remnant charge built up is reduced, the stress induced onto the display due to the remnant charges are reduced as well, which improves display durability as well as its performance. Furthermore, by clustering the display pixels for reset, especially for a display of high resolution, this driving configuration can improve the reset or updating efficacy as well as lowering the power consumption. In this configuration, the number of cardinal display pixels that will require a second waveform (e.g., an edge clearing waveform) will be no more than (n×2)+2, where n is the number of display pixels designated with the same numerical number and being driven together with the first waveform. For example, when two display pixels are being driven together with the first waveform, no more than six cardinal display pixels will be driven with the edge clearing waveform; and when three display pixels are being driven together with the first waveform, no more than eight cardinal display pixels will be driven with the edge clearing waveform.

Figure 3E:
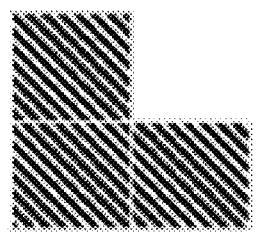
FIG. 3A-FIG. 3J are some exemplary configurations of how display pixels may be clustered for updating or resetting purposes.
Figure 3D:
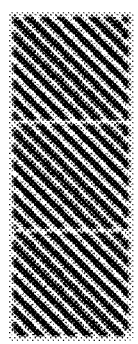
Figure 3C:
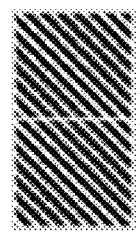
Figure 3B:
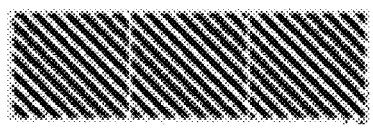
Figure 3A:
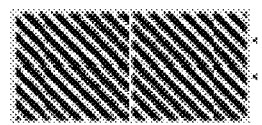
Figure 3J:
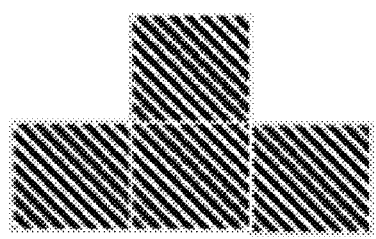
Figure 3I:
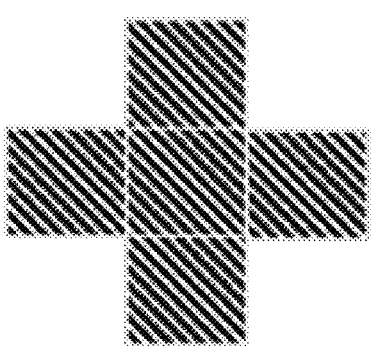
Figure 3H:
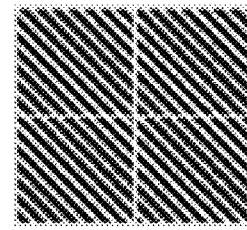
Figure 3G:
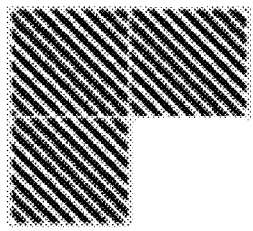
Figure 3F:
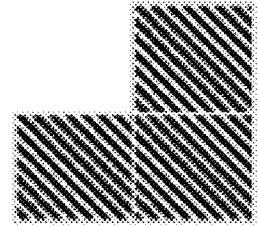

In practice, the clustering of the display pixels to be cleared or reset may take various forms and fashion to further improve driving efficacy and reduce remnant charge built up. FIGS. 3A-3J illustrate some exemplary configurations that may be used. For example, FIGS. 3A and 3C illustrate two display pixels being driven together, and consequently, no more than six cardinal pixels surrounding these two pixels will need to be driven with an edge clearing waveform; FIGS. 3B and 3D illustrate three display pixels being driven together, and consequently, no more than eight cardinal pixels surrounding these three pixels will need to be driven with an edge clearing waveform. FIGS. 3E, 3F and 3G illustrate three display pixels being driven together, and because they are not positioned in a linear fashion unlike the configuration presented in FIGS. 3B and 3D, these configurations will need only apply the edge clearing waveform to only seven cardinal display pixels. Furthermore, FIG. 3H and 3J illustrate two configurations where four display pixels are being driven together in a clustered fashion, resulting in no more than eight cardinal pixels requiring the edge clearing waveform. In another embodiment presented in FIG. 3I, five display pixels are arranged in a configuration where one pixel is centered in the middle surround by four other pixels. In this configuration, only eight cardinal pixels will require the edge clearing waveform.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A method for driving an electrophoretic display having a plurality of display pixels arranged in a matrix comprising a two-dimensional array of rows and columns of display pixels, the method comprising: dividing the plurality of display pixels into a plurality of groups of display pixels, wherein each group of display pixels comprises a plurality of clusters, wherein each cluster includes three adjacent display pixels; updating one group of display pixels from the plurality of groups of display pixels during a first frame, wherein display pixels not in the one group of display pixels are not updated during the first frame, wherein each cluster of three adjacent display pixels in the one group of display pixels is updated at the same time; and applying an edge clearing waveform to no more than eight cardinal pixels of the three adjacent display pixels of each cluster in the one group of display pixels, during the first frame.

2. The method of claim 1 wherein each of the plurality of clusters is arranged as three consecutive display pixels in a row of the matrix.

3. The method of claim 1 wherein each of the plurality of clusters is arranged as three consecutive display pixels in a column of the matrix.

4. The method of claim 1 wherein each of the plurality of clusters is arranged such that two of its three display pixels are adjacent in a row of the matrix and two of its three display pixels are adjacent in a column of the matrix.

5. The method of claim 4 wherein an edge clearing waveform is applied to no more than seven cardinal pixels of each cluster in the one group of display pixels.

6. The method of claim 1 wherein each of the plurality of clusters includes two consecutive display pixels in a row of the matrix and two consecutive display pixels in a column of the matrix, wherein at least one display pixel of the cluster shares a common side with at least two other display pixels in the cluster.

7. The method of claim 6 wherein an edge clearing waveform is applied to no more than seven cardinal pixels of each cluster in the one group of display pixels.

8. The method of claim 1 wherein each of the three adjacent display pixels of each cluster shares at least one common vertex or one common side with at least one other display pixel of the cluster.

9. A method for driving an electrophoretic display having a plurality of display pixels arranged in a matrix comprising a two-dimensional array of rows and columns of display pixels, the method comprising: dividing the plurality of display pixels into a plurality of groups of display pixels, wherein each group of display pixels comprises a plurality of clusters, wherein each cluster includes four adjacent display pixels; updating one group of display pixels from the plurality of groups of display pixels during a first frame, wherein display pixels not in the one group of display pixels are not updated during the first frame, wherein each cluster of four adjacent display pixels in the one group of display pixels is updated at the same time; and applying an edge clearing waveform to no more than eight cardinal pixels of the four adjacent display pixels of each cluster in the one group of display pixels, during the first frame.

10. The method of claim 9 wherein each of the four adjacent display pixels of each cluster shares at least one common vertex or one common side with at least one other display pixel of the cluster.

11. The method of claim 9 wherein each of the four adjacent display pixels of each cluster shares a common side with at least two other display pixels of the cluster.

12. The method of claim 9 wherein three of the four adjacent display pixels of each cluster shares a common side with only one other display pixel of the cluster.

13. A method for driving an electrophoretic display having a plurality of display pixels arranged in a matrix comprising a two-dimensional array of rows and columns of display pixels, the method comprising: dividing the plurality of display pixels into a plurality of groups of display pixels, wherein each group of display pixels comprises a plurality of clusters, wherein each cluster includes five adjacent display pixels; updating one group of display pixels from the plurality of groups of display pixels during a first frame, wherein display pixels not in the one group of display pixels are not updated during the first frame, wherein each cluster of five adjacent display pixels in the one group of display pixels is updated at the same time; and applying an edge clearing waveform to no more than eight cardinal pixels of the five adjacent display pixels of each cluster in the one group of display pixels, during the first frame.

14. The method of claim 13 wherein each of the plurality of clusters is arranged in a configuration where one display pixel is centered and surrounded by four display pixels.

15. The method of claim 14 wherein each of the four display pixels is adjacent to the one display pixel that is centered.

16. The method of claim 14 wherein each of the four display pixels shares one side with the one display pixel that is centered.

17. The method of claim 13 wherein each of the five adjacent display pixels of each cluster shares at least one common vertex or one common side with at least one other display pixel of the cluster.

\* \* \* \* \*